United States Patent [19]
Smith et al.

[11] Patent Number: 4,639,176
[45] Date of Patent: Jan. 27, 1987

[54] TRUSS PLATE

[76] Inventors: Glenn C. Smith; James R. Needham, both of 2914 E. Katella Ave., Orange, Calif. 92667; William T. Turnbull, 1307 W. Sixth St., Suite 114, Corona, Calif. 91720

[21] Appl. No.: 820,227

[22] Filed: Jan. 21, 1986

[51] Int. Cl.$^4$ .............................................. F16B 15/00
[52] U.S. Cl. ...................... 411/468; 52/693; 52/712; 52/DIG. 6; 403/405.1
[58] Field of Search ............... 52/693, 712, DIG. 6, 52/713, 715, 696; 411/459, 466, 467, 468; 403/283, 405–407

[56] References Cited

U.S. PATENT DOCUMENTS

| | | | |
|---|---|---|---|
| 3,633,454 | 1/1972 | Schmitt | 411/468 |
| 3,951,833 | 4/1976 | Moehlenpath | 411/468 |
| 4,235,148 | 11/1980 | Menge | 52/DIG. 6 |
| 4,318,652 | 3/1982 | Gore | 411/468 |
| 4,343,580 | 8/1982 | Moyer et al. | 52/DIG. 6 |
| 4,486,115 | 12/1984 | Rionda et al. | 52/DIG. 6 |

Primary Examiner—William F. Pate, III
Assistant Examiner—Richard E. Chilcot
Attorney, Agent, or Firm—Cullen, Sloman, Cantor, Grauer, Scott and Rutherford

[57] ABSTRACT

A truss plate for connecting together wood members forming trusses, joists, beams and the like construction parts, formed of stiff sheet metal having struck-out teeth extending perpendicularly to the body of the plate. The teeth are struck-out in pairs, leaving an elongated slot between each pair of teeth. The slots, and their teeth, are aligned in numerous longitudinal rows. The rows form groups whose slots are also transversely aligned, but with the slots of one group being longitudinally offset relative to the slots of its adjacent group. The teeth are V-shaped in cross-section and are axially twisted. Their free ends form asymmetrical V-shaped tips. A pair of such plates are arranged in face-to-face contact with the teeth of the uppermost plate extending through the slots in the lowermost plate for closely positioning together adjacent teeth to form a double thickness plate with pairs of double teeth.

9 Claims, 8 Drawing Figures

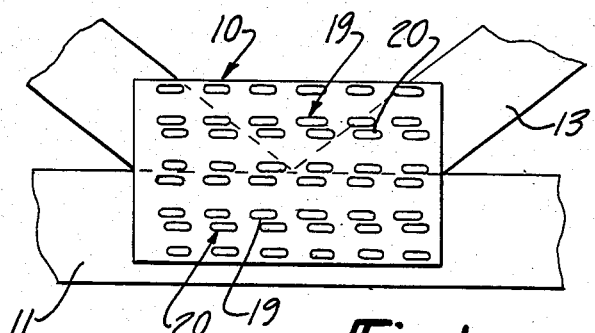
Fig-1
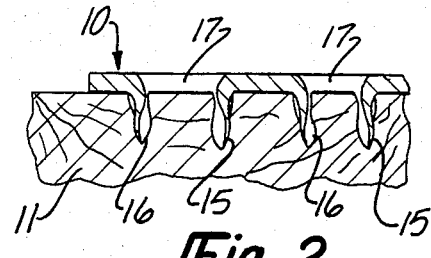
Fig-2
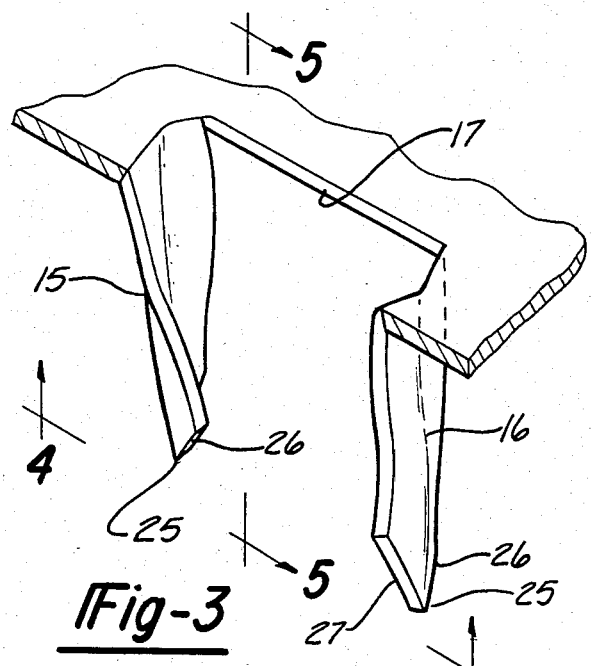
Fig-3
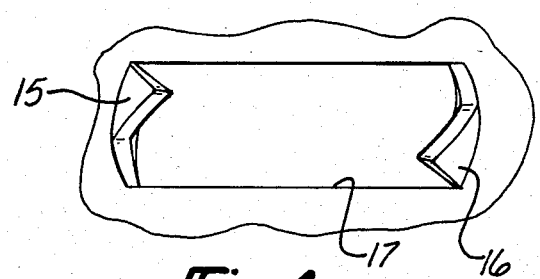
Fig-4
Fig-5
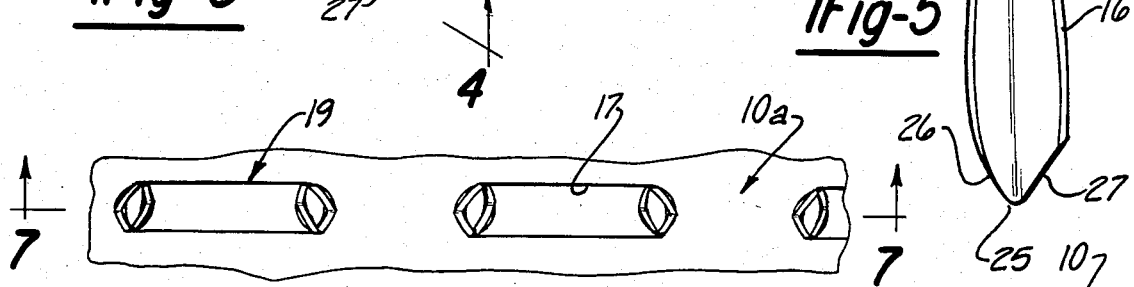
Fig-6
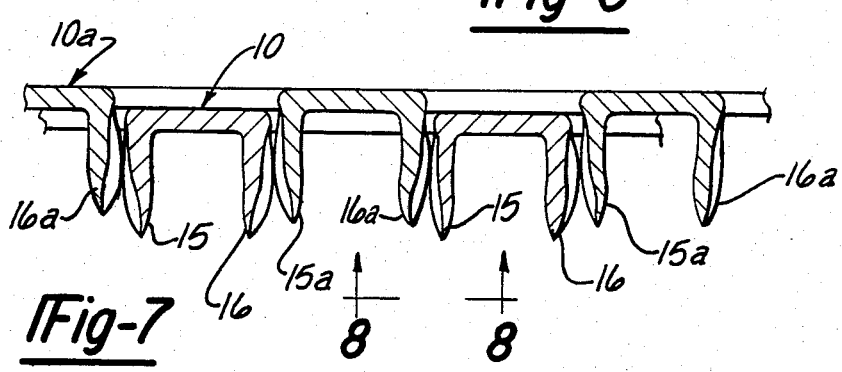
Fig-7
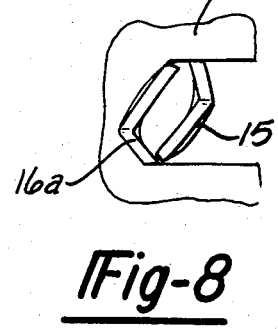
Fig-8

TRUSS PLATE

BACKGROUND OF INVENTION

Truss connector plates are widely used for joining together wood members used in forming trusses, joists, beams and the like construction elements. Typically, such plates are made of thin, relatively stiff, sheet metal, such as galvanized steel or the like, with struck-out teeth that embed into the wood members. Examples of such plates are shown in U.S. Pat. Nos. 3,651,612 issued Mar. 28, 1972 and 4,207,719 issued June 17, 1980.

In use, wood members, as for example 2×4 strips are arranged on a flat surface, with their ends or other parts located in close proximity to provide a joint. A truss connector plate is placed over the joint location. By means of a suitable compression device, such as a hydraulic clamp, or by hammering, the plate is pressed against the wood so that its teeth embed into the wood to form a joint. The joints may be in different shapes and styles. For example, there may be two wood strips arranged side by side and simply joined together to form a double thick wood strip. Alternatively, the ends of wood strips may be joined together to form a double length. For truss constructions, the end of one strip may be angled and placed against a mid point of another strip and these may be joined together to form a truss. Numerous configurations are used. Typically, a pair of plates are used, one on each side of the wood member joint.

In the joint construction resulting from the use of typical connector plates, because the wood and its fibers are relatively flexible, over a period of time, there is a tendency for the teeth to loosen within the wood. This may be due to the effects of temperature and weather upon the wood fibers and also due to the movement of the wood members under varying loads. Regardless of the cause, there is a tendency for the teeth of the connector plates to move relative to the wood so that they loosen in gripping the wood.

In addition, the connector plates are designed to handle predetermined shear loads. Thus, more plates or larger size plates or increased thickness plates must be used for increased anticipated shear loads.

Thus, there has been a need for plates which tend to more tightly grip and resist dislodgment from the wood and also, to increase the load handling capacity of each plate, particularly the shear loads, without substantially increasing the costs of the plates.

SUMMARY OF INVENTION

The invention herein contemplates the provision of a truss connector plate made of thin, stiff, sheet metal, having struck-out teeth for embedding within wood members. The teeth are formed in pairs, that is, they are struck out of the plate in pairs, resulting in elongated slots between each adjacent pair of teeth. These slots are arranged in longitudinal rows, with adjacent rows longitudinally offset relative to each other. The teeth are roughly V-shaped in cross-section, are axially twisted a substantial amount from their base to their tips, and their tips are asymmetrically V-shaped.

The pairs of teeth, due to their cross-sectional shapes, twists and asymmetrical tip formations, tend to more tightly interlock with the fibers of the wood members and resist loosening. Further, they provide increased shear strength capacities for a particular size and thickness plate.

Moreover, the invention contemplates utilizing two truss connector plates together, with the plates arranged in face-to-face contact and the teeth of the uppermost plate forcibly extended through the slots of the lowermost plate. Each pair of teeth extends into two adjacent slots of the lowermost plate. The teeth of the uppermost plate are closely adjacent to corresponding teeth of the lowermost plate, but due to their respective shapes, the two adjacent teeth are partially gapped apart along their lengths, particularly at their tips to form sets of double teeth with space between the teeth of each set to receive and interlock with wood fibers.

The double plate configuration produces an unexpectably substantial increase in the interlock between the plates and the wood members and resistance against loosening of the teeth. Also, this configuration greatly increases the strength of the plates in resisting loads, particularly shear loads.

An object of this invention is to provide truss connector plates which resist loosening of the teeth within the wood members and which have increased strength, without substantial increases in the expense of the plates. The configuration of the double teeth and the double plate arrangement, does not substantially increase costs, since the teeth of both plates are simply punched out of the flat plate blanks in the same manner. Hence, the stacking of one plate upon another, while possibly doubling the cost of a single plate, produces more than double strength characteristics. The result is that the relative cost can be substantially the same as or even less than prior thicker plates used for increased strength requirements.

These and other objects and advantages of this invention will become apparent upon reading the following description, of which the attached drawings are a part.

DESCRIPTION OF DRAWINGS

FIG. 1 is a fragmentary, elevational view, of a typical joint between three wood members and a truss connector plate forming part of a truss.

FIG. 2 is an enlarged, fragmentary, cross-sectional view showing a portion of a truss connector plate with its teeth embedded in an adjacent wood member.

FIG. 3 is an enlarged, fragmentary, perspective view of a pair of teeth, and

FIG. 4 is an end view of a pair of teeth taken in the direction of arrows 4—4 of FIG. 3.

FIG. 5 is an elevational view of a single tooth, taken in the direction of arrows 5—5 of FIG. 3.

FIG. 6 is an enlarged, plan view of a portion of a row of teeth where two plates are assembled together.

FIG. 7 is a cross-sectional view taken in the direction of arrows 7—7 of FIG. 6 showing a fragment of two plates assembled together to form double teeth.

FIG. 8 is an end view of a set of double teeth, taken in the direction of arrows 8—8 of FIG. 7.

DETAILED DESCRIPTION

FIG. 1 illustrates a truss connector plate 10 fastened to a horizontal wood strip 11 and two angled wood strips 12 and 13 which together form a three-way joint, such as is commonly found in trusses. The wood strips may be conventional 2×4's, 2×6's or the like. Such plates may be used on various size wood strips which, together with the plate, provide joints. Usually, a plate is provided on each side of the joint.

The plate 10 has numerous struck-out teeth 15 and 16 formed as pairs by striking them out of the plate blank, leaving longitudinal slots 17 along the plate. These slots are arranged in longitudinal rows 19 and 20. The slots in each row are longitudinally aligned and the rows form two different groups which have their slots transversely aligned.

As shown in FIG. 1, the rows 19 and 20 are closely adjacent each other and then a considerable space is left between the next adjacent rows, e.g., a space about equal to another row of slots. Alternatively, the rows of slots may be formed in sets of three, with the central row being advanced longitudinally relative to the two side rows. While the longitudinal advancement of one row of slots next to the other may be varied, about 1/10th of an inch has been found to be a good optimum distance, as will be explained below.

The teeth 15 and 16 of each pair are struck out of the flat, steel blank from which the plate is made by a suitable pinch which is shaped to bend the teeth perpendicularly to the plane of the plate and simultaneously bend the teeth into a V-shaped cross-section and also, twist the teeth axially so that each tooth is twisted from its base towards its free end. The free end of each tooth forms an asymmetrical V-shaped tip 25 having a short leg 26 and a longer leg 27.

While the sizes and shapes of the teeth and of the plates themselves may be varied somewhat, an example of an optimum construction is as follows:

| | |
|---|---|
| Number of teeth per sq. inch | 9.41 |
| Tooth cross-section | 0.106 inch × 0.0396 inch |
| Tooth length | 0.33 inch |
| Tooth base radius | 0.306 inch |
| Tooth twist at tip, relative to base | 36.5 degrees |
| Tooth V-shape cross-section depth | 0.26 inch |
| Distance between adjacent ends of slots | 0.35 inch |
| Distance between two adjacent rows | 0.144 inch |
| Metal to wood ratio of completed joint | 3.96% |

An example of a suitable material out of which the plate may be made is No. 20 gauge, A446 Grade A galvanized steel.

The twist of each tooth preferably varies in the range of about 30-40 degrees from base to tip. All of the above dimensions may also be varied somewhat. The size of the plate and the number of teeth may vary depending upon the size and strength of the joint to be formed thereby.

In order to increase the strength of the joint and the interconnection between the teeth and the wood, a second, identical plate may be used along with a first plate. The second plate 10a (see FIGS. 6-8) is laid over the first plate and its teeth are forced through the slots of the underlying plate to form sets of adjacent teeth which form a double tooth configuration. As can be seen in the drawings, the space between each pair of teeth in the upper plate are correlated to the space between adjacent slots so that the upper teeth can be forced into the slot beneath them. The V-shaped cross-section, the twist of each tooth and the asymmetrical tip of each tooth results in the adjacent teeth of the upper and lower plates forming a double tooth set. The two teeth of each set are somewhat gapped apart along their lengths producing a hollow tubular-like fastener. The net result is a tooth configuration which more tightly interlocks with the fibers of the wood and more strongly resists shear loads and any tendencies to pull free or loosen relative to the wood.

Having fully described an operative embodiment of this invention, we now claim:

1. A truss connector plate formed of a stiff, thin sheet metal plate having numerous teeth struck-out of the plate for embedding in wood members for joining said members together to form trusses, beams, and the like construction elements, comprising:

the teeth being aligned in a number of longitudinal rows along the plate, and being formed in pairs that are struck-out of, and extend approximately perpendicularly to, the sheet metal plate with an elongated, longitudinally directed slot between each pair of teeth, and with the adjacent ends of the slots being spaced apart longitudinally;

each tooth being bent along its central axis into a generally V-shaped cross-section, and being radially twisted and predetermined amount from its base to its free end tip, and having an asymmetrical V-shaped tip formed in a V-shape having one leg longer than the other; and, a second plate, including teeth identically configured to the first mentioned plate, said second plate being arranged in face-to-face contact with the first mentioned plate, with the teeth of the second plate being forcibly inserted through the adjacent slots of the first plate, and the teeth of the second plate being closely arranged to their adjacent teeth of the first plate and due to their twisted configuration and cross-sectional shapes, the adjacent teeth being partially gapped apart along their lengths to form double tooth sets for interlocking with a wood member.

2. A truss connector plate as defined in claim 1, and wherein the distance between each of the adjacent slot ends is less than the length of the slots.

3. A truss connector plate as defined in claim 1, and including the slots being of uniform length and the distance between the ends of adjacent slots being less than the length of the slots;

and including a second plate, including teeth identically configured to the first mentioned plate, being arranged in face-to-face contact with the first mentioned plate, with the teeth of the second plate being forcibly inserted through the adjacent slots of the first plate, and the teeth of the second plate being closely arranged to their adjacent teeth of the first plate and due to their twisted configuration and cross-sectional shapes, the adjacent teeth being partially gapped apart along their lengths to form double tooth sets for interlocking with a wood member.

4. A truss connector plate as defined in claim 1, and with the alternating longitudinal rows of slots being aligned transversely, but being longitudinally offset relative to the slots in their adjacent longitudinal rows.

5. A truss connector plate as defined in claim 1, and with the longitudinal rows of slots, with their pairs of teeth, being formed into two groups, with the slots of each group being transversely aligned, but with the slots of one group being longitudinally offset relative to the slots in the other group, and with the rows being arranged so that two adjacent rows, one from each group, are transversely close together, but such two rows are spaced apart a considerable distance from the next adjacent rows.

6. A truss connector plate as defined in claim 1, and including at least some of the rows being transversely aligned but with their slots being roughly 1/10th inch offset longitudinally relative to the other rows, and with the teeth being roughly ⅛ inch in length and axially twisted roughly 30–40 degrees from their bases to their tips, and with roughly 9–10 teeth per square inch of the plate, and the slots being spaced apart roughly 0.35 inches.

7. A truss connector plate formed of two, substantially identical, stiff, thin sheet metal plates, each having numerous teeth struck out for embedding in wood members, comprising:

the teeth being aligned in a number of longitudinal rows along the plate, and being formed in pairs that are struck-out and extend approximately perpendicularly to the body of their plate, with an elongated, longitudinally directed slot formed between each pair of teeth due to the strike out of the teeth, and with the adjacent ends of the slots being spaced apart longitudinally, and the slots being of uniform length, and spaced apart a distance less than their respective lengths;

each tooth being bent along its central axis into a generally V-shaped cross-section, and being radially twisted, and having an asymmetrical V-shaped free end tip wherein one leg of the V-shape is longer than the other;

with one truss plate being laid over upon the other plate in face-to-face contact, and the teeth of the uppermost plates being forcibly pushed through the slots of the lowermost plate, so that each pair of teeth of the uppermost plate fit into adjacent slots of the lowermost plate;

the teeth of the uppermost plate each being closely adjacent to corresponding teeth in the lowermost plate and due to their respective V-shape cross-sections and twisted configuration, each adjacent pair of teeth are at least partially gapped apart along their lengths and at their tips, thereby forming sets of double teeth;

whereby when the plate is pressed against wood members and the teeth are embedded therein, the individual sets of double teeth tend to twist into and interlock with the wood fibers of the wood members and resist withdrawal therefrom, and their respective V-shape cross-sections and twisted shapes increase the shear force resistance of the teeth.

8. A truss connector plate as defined in claim 7, and with the longitudinal rows of slots being formed into two groups, with the slots of each group being transversely aligned, but with the slots of one group being longitudinally offset relative to the slots in the next group, and with the rows being arranged so that two aligned rows, one from each group, are transversely close together, and then such two adjacent rows are transversely spaced apart a considerable distance from the next pair of adjacent rows.

9. A truss connector plate as defined in claim 7, and at least some of the rows being transversely aligned but with their slots being roughly 1/10th inch offset longitudinally relative to the other rows, and with the teeth being roughly ⅛ inch in length and axially twisted roughly 30–40 degrees from their bases to their tips;

and with roughly 9–10 teeth per square inch of plate, with the slot ends being spaced apart roughly 0.35 inches.

* * * * *